United States Patent
Fujiki et al.

(10) Patent No.: US 6,425,600 B1
(45) Date of Patent: Jul. 30, 2002

(54) SILICONE RUBBER COMPOSITION FOR COATING AIR BAGS

(75) Inventors: Hironao Fujiki; Yoshifumi Harada; Takeshi Miyao; Yoshifumi Inoue, all of Gunma-ken (JP)

(73) Assignee: Shin-Etsu Corporation, Tokyo (JP)

( * ) Notice: Subject to any disclaimer, the term of this patent is extended or adjusted under 35 U.S.C. 154(b) by 0 days.

(21) Appl. No.: 09/734,743

(22) Filed: Dec. 13, 2000

(30) Foreign Application Priority Data

Dec. 13, 1999 (JP) ............................................ 11-353534

(51) Int. Cl.$^7$ ............................................... B60R 21/16
(52) U.S. Cl. ...................... 280/728.1; 528/15; 528/32; 528/31; 525/478; 556/458; 556/451; 549/215; 428/447; 524/588; 524/114; 524/261; 524/492
(58) Field of Search ............................... 528/15, 32, 31; 525/478; 556/458, 451; 549/215; 428/447; 524/588, 114, 261, 492; 280/728.1

(56) References Cited

FOREIGN PATENT DOCUMENTS

| EP | 0 553 840 A | 8/1993 |
| EP | 0 669 419 A | 8/1995 |
| EP | 1 078 823 A | 2/2001 |
| FR | 2 751 980 | 2/1998 |
| JP | A6378744 | 4/1988 |
| JP | 7-70923 | 3/1995 |
| JP | 7-195990 | 8/1995 |
| JP | 2513101 | 4/1996 |
| JP | 2592021 | 12/1996 |
| JP | 9-87585 | 3/1997 |
| JP | 9-208899 | 8/1997 |
| JP | 9-208900 | 8/1997 |

*Primary Examiner*—Robert Dawson
*Assistant Examiner*—Kuo-Liang Peng
(74) *Attorney, Agent, or Firm*—Birch, Stewart, Kolasch & Birch, LLP

(57) ABSTRACT

Silicone rubber compositions comprising (A) an organopolysiloxane having at least two silicon-bonded alkenyl groups, (B) finely divided silica, (C) an adhesive component, (D) a silicone-soluble organopolysiloxane resin component bearing at least one alkenyl group, (E) an organohydrogenpolysiloxane containing SiH groups in a specific mole ratio to the alkenyl groups in components (A) and (D) combined, and (F) a platinum group catalyst, exhibit excellent adhesion to synthetic woven fabrics for air bags. When coated onto woven fabrics and cured, the compositions provide air bag base fabrics of outstanding flexibility, sealability and deployability which remain stable over time.

9 Claims, 2 Drawing Sheets

SILICONE RUBBER COMPOSITION FOR COATING AIR BAGS

BACKGROUND OF THE INVENTION

1. Field of the Invention

The present invention relates to silicone rubber compositions for coating air bags such as are used for safety purposes in vehicles. More specifically, the invention relates to silicone rubber compositions for coating air bags, which compositions have an adhesive strength capable of withstanding the shock of deployment, and especially high-temperature deployment. The invention relates in particular to silicone rubber compositions for coating air bags which, when coated on a base fabric to a thickness of 20 to 50 μm, can prevent air from escaping for a period of several seconds.

2. Prior Art

Air bags are in wide use today as a safety device for protecting automobile occupants. Such air bags are generally made of a base fabric composed of a nylon woven fabric coated with chloroprene rubber. Yet, chloroprene rubber-coated base fabrics are not conducive to a lighter air bag construction. In addition, their properties tend to deteriorate over time, which is a particular concern.

Air bag base fabrics coated with silicone rubber have recently been described (see JP-A 63-78744). A silicone rubber-coated air bag base fabric provides excellent high-temperature properties, in addition to which the ability to coat the base fabric with a thin film of silicone rubber makes it possible to achieve a lightweight construction.

However, the silicone rubber does not adhere with sufficient strength to the synthetic woven fabrics such as nylon 66 used in air bags. Investigations on coating materials aimed at enhancing the adhesive strength and doing away with the use of solvents have led to the development of aqueous emulsion-type silicone coating materials (see, for example, JP No. 2513101 corresponding to U.S. Pat. No. 5,399,402, JP-A 9-208899, JP-A 9-208900) and liquid silicones.

Related art having to do with liquid silicone rubber coating materials is described in, for example, JP No. 2592021 corresponding to U.S. Pat. No. 5,877,256, JP-A 7-70923, JP-A 7-195990 corresponding to EP 663468A and JP-A 9-87585 corresponding to U.S. Pat. No. 5,789,084. These prior-art liquid silicone rubber compositions do indeed have improved adhesive strength to nylon and other base fabrics, and can be applied without the use of a solvent. However, in recent curtain-type air bags, the air pressure within the air bag must be maintained for a length of time following deployment, which is often beyond the capabilities of such prior-art compositions.

SUMMARY OF THE INVENTION

It is therefore an object of the invention to provide a silicone rubber composition for coating air bags which has excellent adhesive strength to the synthetic woven fabrics used to make air bags, outstanding folding and packing properties or flexibility, airtightness or sealability, and deployability or openability, and minimal change in properties or deterioration over time.

We have found that a certain type of silicone rubber composition, when coated onto a synthetic woven fabric of the type used in air bags, provides an air bag base fabric having excellent strength, adhesive properties and airtightness, and thus effectively achieves the foregoing object.

Accordingly, the invention provides a silicone rubber composition for coating air bags, which composition comprises (A) 100 parts by weight of an organopolysiloxane having at least two silicon-bonded alkenyl groups per molecule, (B) at least 0.5 part by weight but less than 5 parts by weight of finely divided silica, (C) 0.1 to 20 parts by weight of an adhesive component, (D) 5 to 40 parts by weight of a silicone-soluble resin containing a $R_3SiO_{1/2}$ unit and a $SiO_2$ unit or $RSiO_{3/2}$ unit or both (i.e., a $R_3SiO_{1/2}$ unit and a $SiO_2$ unit and/or a $RSiO_{3/2}$ unit), and bearing at least one alkenyl group per molecule, wherein R is a substituted or unsubstituted monovalent hydrocarbon group, (E) an organohydrogenpolysiloxane containing at least two units per molecule selected from among $HR^1_2SiO_{1/2}$, $HR_1SiO$ and $HSiO_{3/2}$ units, wherein $R^1$ is a substituted or unsubstituted monovalent hydrocarbon unit without an aliphatic unsaturated bond, in a sufficient amount to provide 0.5 to 3.0 moles of SiH groups per mole of alkenyl groups in components (A) and (D) combined, and (F) a platinum group catalyst in a sufficient amount to provide 1 to 2,000 ppm of platinum group metal atoms based on the weight of components (A) to (E) combined.

DETAILED DESCRIPTION OF THE INVENTION

Figure 1:
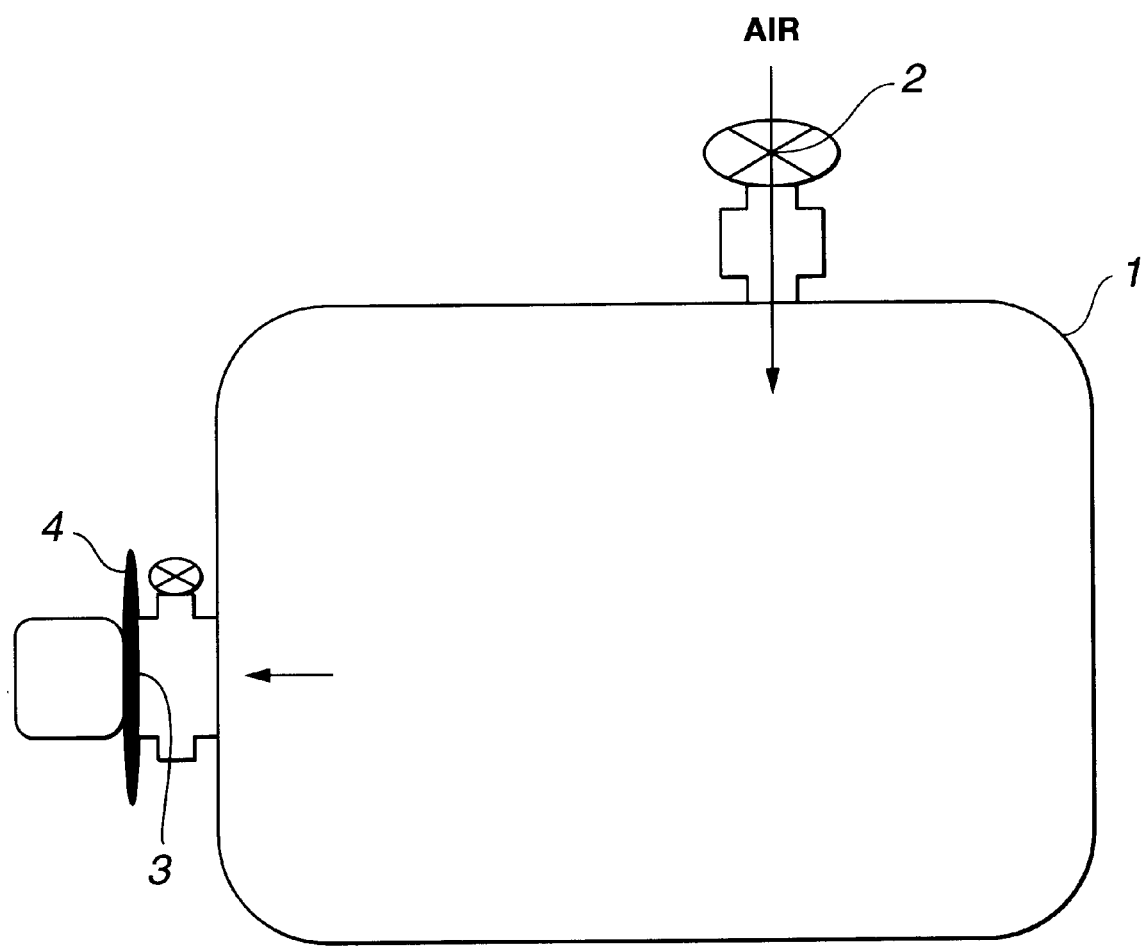
FIG. 1 schematically illustrates the method for testing airtightness (gas transmission) used in evaluating the silicone rubber compositions of the invention.

Component (A) in the silicone rubber composition of the invention is an organopolysiloxane which serves as the base polymer of the composition. In order for the composition to form a silicone rubber coat having rubbery elasticity after curing, the organopolysiloxane must have at least two silicon-bonded alkenyl groups per molecule. The organopolysiloxane is preferably a substantially linear diorganopolysiloxane of the average compositional formula (1):

$$R^2_n SiO_{(4-n)/2} \qquad (1)$$

wherein $R^2$ is a substituted or unsubstituted monovalent hydrocarbon group, and n is a positive number from 1.9 to 2.1.

Exemplary $R^2$ groups are silicon-bonded substituted or unsubstituted monovalent hydrocarbon groups having 1 to 12 carbons, and preferably 1 to 8 carbons, including alkyls such as methyl, ethyl, propyl, isopropyl, butyl, isobutyl, tert-butyl, pentyl, neopentyl, hexyl, heptyl, octyl, nonyl, decyl and dodecyl; cycloalkyls such as cyclopentyl, cyclohexyl and cycloheptyl; alkenyls such as vinyl, allyl, propenyl, isopropenyl, butenyl, isobutenyl, hexenyl and cyclohexenyl; aryls such as phenyl, tolyl, xylyl, naphthyl and biphenyl; aralkyls such as benzyl, phenylethyl, phenylpropyl and methylbenzyl; and any of the foregoing hydrocarbon groups in which some or all of the hydrogen atoms are replaced with suitable substituents such as halogen atoms (e.g., fluorine, chlorine, bromine) or cyano groups, examples of which include chloromethyl, 2-bromoethyl, 3,3,3-trifluoropropyl, 3-chloropropyl and cyanoethyl.

Preferably, the organopolysiloxane is one in which at least 90 mole percent (i.e., 90 to 99.99 mol %, more preferably 95 to 99.98 mol %) of the substituted or unsubstituted monovalent hydrocarbon groups represented by R2 are methyl groups. The organopolysiloxane also has, on average, at least two alkenyl groups. The alkenyl groups typically represent 0.01 to 10 mole percent, and preferably 0.02 to 5 mole percent, of all the $R^2$ groups. The presence of too few alkenyl groups may lower the curability of the resulting composition, whereas the presence of too many may diminish the physical properties of the cured product, such as its tensile strength, tear strength and elongation. The alkenyl groups may be bonded to silicon atoms at the ends of the molecular chain or silicon atoms at the middle of the molecular chain, or may be present on both. The alkenyl groups are preferably vinyl. $R^2$ groups other than methyl and vinyl are preferably phenyl or 3,3,3-trifluoropropyl.

In above formula (1), the letter n is a positive number from 1.9 to 2.1, and especially from 1.95 to 2.05. It is advantageous for the organopolysiloxane to have a molecular structure which is basically a linear diorganopolysiloxane composed of repeating diorganosiloxane units ($R^2{}_2SiO_{2/2}$) and having alkenyl groups at both ends of the molecular chain, although the molecule may have in portions thereof a branched structure containing $R^2SiO_{3/2}$ units or $SiO_{4/2}$ units. Preferably, the organopolysiloxane molecular chain is end-capped with triorganosilyl groups (or $R^2{}_3SiO_{1/2}$ units) such as trivinylsilyl, methyldivinylsilyl, dimethylvinylsilyl or trimethylsilyl.

The organopolysiloxane (A) preferably has a viscosity of at least 100 centistokes at 25° C., and a viscosity of at least 1,000 centistokes at 25° C. is especially preferred for attaining a good silicone rubber coat strength and to ensure that the composition is easy to blend. To assure such desirable properties as workability of the composition, a viscosity of not more than 100,000 centistokes, and especially not more than 50,000 centistokes, is preferred.

Suitable examples of such organopolysiloxanes include dimethylpolysiloxane capped at both ends with dimethylvinylsiloxy groups, dimethylsiloxane-methylvinylsiloxane copolymer capped at both ends with dimethylvinylsiloxy groups, dimethylsiloxane-methylvinylsiloxane copolymer capped at both ends with trimethylsiloxy groups, and dimethylsiloxane-methylphenylsiloxane copolymer capped at both ends with dimethylvinylsiloxy groups.

Component (B) in the silicone rubber composition of the invention is a finely divided silica. Any well-known finely divided silica which is employed as a reinforcing filler in silicone rubber may be used without particular limitation. Examples of such silica include fumed silica and precipitated silica. Of these, a very finely divided silica having an average particle size of at most 50 mµ and a specific surface area, as measured by a BET adsorption method, of at least 50 m²/g, generally 50 to 400 m²/g, and especially about 100 to about 300 m²/g, is preferred. Surface-treated silica, such as silica that has been surface treated with an organosilane, organosilazane or diorganocyclopolysiloxane, is especially preferred.

One parameter responsible for the distinctive features of the invention is the amount of finely divided silica added to the silicone rubber composition. Addition in an amount of less than 0.5 part by weight per 100 parts by weight of the alkenyl group-containing organopolysiloxane (A) fails to impart thixotropic properties to the silicone rubber composition, as a result of which a large amount of the composition penetrates into the base fabric, lowering the airtightness of the coated fabric. On the other hand, surprisingly, the addition of 5 or more parts by weight lowers the tear strength of the base fabric coated with the composition. However, addition of the finely divided silica in an amount of at least 0.5 part by weight but less than 5 parts by weight per 100 parts by weight of the alkenyl group-containing organopolysiloxane (A) resolves the problem of silicone rubber coat formability on the base fabric and also confers the coated base fabric with strength and airtightness. Addition in an amount of 0.5 to 4.5 parts by weight, especially 1 to 4 parts by weight is preferred.

An adhesive component is used as component (C) in the inventive composition for the purpose of enhancing the ability of the silicone rubber composition to adhere to the material of which the base fabric is made, such as nylon 6, nylon 66 or polyester. When the synthetic woven fabric in the air bag is made of nylon, the adhesive component is preferably an organosilicon compound, such as an organosilane or a linear or cyclic organopolysiloxane, having an epoxy group bonded to a silicon atom through an alkylene group such as a methylene, ethylene, propylene, tetramethylene or methylethylene group. Illustrative examples include epoxy group-bearing organoalkoxysilanes such as γ-glycidoxypropyltrimethoxysilane and 3,4-epoxycyclohexylethyltrimethoxysilane; and epoxy group-bearing organopolysiloxanes such as epoxy group-bearing organopolysiloxanes which have vinyl and alkoxy groups, epoxy group-bearing organopolysiloxanes which have silicon-bonded hydrogen atoms, and epoxy group-bearing organopolysiloxanes which have silicon-bonded hydrogen atoms and alkoxy groups. Other compounds that may be used for the same purpose include compounds having a vinyl or hydrosilyl group (i.e., SiH group) and a silicon-bonded alkoxy group, and polysiloxanes having alkoxysilyl groups. Any of the above may be used alone or in combinations thereof as component (C).

The adhesive component (C) is included in an amount of 0.1 to 20 parts by weight, and preferably 0.2 to 5 parts by weight, per 100 parts by weight of component (A). Too little adhesive component fails to provide the desired adhesive effects. The use of too much results in excessive thixotropy, which makes the silicone rubber composition difficult to coat onto the base fabric, and is moreover uneconomical.

Component (D) is a silicone-soluble resin (i.e., organopolysiloxane having three-dimensional network structure) which contains $R_3SiO_{1/2}$ units and $SiO_2$ and/or $RSiO_{3/2}$ units, and which bears at least one alkenyl groups preferably having 2 to 6 carbon atoms per molecule. The silicone-soluble resin (D) is used for the purpose of imparting strength to the silicone rubber composition.

In the foregoing formulas, R is a substituted or unsubstituted monovalent hydrocarbon group similar to $R^2$ described above, preferably one having 1 to 10 carbons, and especially 1 to 8 carbons. R is exemplified by the same groups as mentioned above for $R^2$.

Preferably, the resin (D) contains 30 to 60 mole percent, and especially 35 to 55 mole percent, of $R_3SiO_{1/2}$ units; 30 to 70 mole percent, and especially 40 to 65 mole percent, of $SiO_2$ units and/or $RSiO_{3/2}$ units. If necessary, the resin may further contain up to 20 mole percent of $R_2SiO_{2/2}$ units. Preferably, the resin has a mole ratio of $SiO_2$ units to $R_3SiO_{1/2}$ units or of $RSiO_{3/2}$ units to $R_3SiO_{1/2}$ units or of $RSiO_{3/2}$ units and $SiO_2$ units combined to $R_3SiO_{1/2}$ units in a range of 0.6 to 1.1.

The resin (D) has an alkenyl group content of preferably 1 to 8% by weight, and especially 2 to 5% by weight. At less than 1% by weight, resin molecules containing no alkenyl groups may form and become incorporated within the organopolysiloxane resin (D). At more than 8% by weight, the silicone rubber obtained by curing the composition may have too low an elongation and a poor heat resistance. The organopolysiloxane resin (D) may also contain in its molecule up to 0.5 mole of silanol or alkoxysilyl groups per 100 g of resin.

Illustrative examples of such organopolysiloxane resins include resins composed of $(CH_3)_3SiO_{1/2}$ units, $(CH_2\!\!=\!\!CH)SiO_{3/2}$ units and $SiO_{4/2}$ units; resins composed of $(CH_2\!\!=\!\!CH)SiO_{3/2}$ units, $(CH_3)_3SiO_{1/2}$ units, $(CH_3)_2SiO_{2/2}$ units and $SiO_{4/2}$ units; resins composed of $(CH_2\!\!=\!\!CH)(CH_3)_2SiO_{1/2}$ units and $SiO_{4/2}$ units; resins composed of $(CH_2\!\!=\!\!CH)(CH_3)_2SiO_{1/2}$ units, $(CH_2\!\!=\!\!CH)SiO_{3/2}$ units and $SiO_{4/2}$ units; resins composed of $(CH_2\!\!=\!\!CH)(CH_3)_2SiO_{1/2}$ units and $(CH_2\!\!=\!\!CH)SiO_{3/2}$ units; resins composed of $(CH_3)_3SiO_{1/2}$ units, $(CH_2\!\!=\!\!CH)(CH_3)_2SiO_{1/2}$ units and $SiO_2$ units; and resins composed of $(CH_2\!\!=\!\!CH)(CH_3)_2SiO_{1/2}$ units and $(CH_3)SiO_{3/2}$ units. The essential constituents in all of these examples are a $R_3SiO_{1/2}$ unit and a $SiO_2$ and/or $RSiO_{3/2}$ unit. The presence in the organopolysiloxane resin (D) of 5% by weight or more of silicone resin molecules containing no vinyl or other alkenyl groups lowers the strength of the coated base fabric. For this reason, it is critical that the molecules contain at least one vinyl or other alkenyl group. The amount of resin containing no vinyl or other alkenyl groups which is inadvertently incorporated during production should be held to less than 5% by weight.

The resin (D) is included in the silicone rubber composition in an amount of 5 to 40 parts by weight, and preferably 10 to 30 parts by weight, per 100 parts by weight of component (A). Too little resin (D) fails to provide the desired strength-imparting effect, whereas too much lowers the elongation of the cured silicone rubber and is uneconomical.

Component (E) of the inventive silicone rubber composition is an organohydrogenpolysiloxane containing at least two units per molecule selected from among $HR^1{}_2SiO_{1/2}$ units, $HR^1SiO$ units and $HSiO_{3/2}$ units (that is, monofunctional, difunctional or trifunctional siloxane units having silicon-bonded hydrogen atoms, or SiH groups). Here, $R^1$ is a substituted or unsubstituted monovalent hydrocarbon unit free from aliphatic unsaturation.

Component (E) may be, in particular, an organohydrogenpolysiloxane of the average compositional formula (2):

$$R^1{}_aH_bSiO_{(4-a-b)/2} \qquad (2)$$

which is a liquid at room temperature. In formula (2), it is preferable that $R^1$ be a substituted or unsubstituted monovalent hydrocarbon unit of 1 to 10 carbons free from aliphatic unsaturation; the letter "a" be 0.7 to 2.1, and especially 1 to 2; the letter "b" be 0.001 to 1.0, and especially 0.01 to 1.0; and the sum a+b be from 0.8 to 3.0, and especially 1 to 2.4.

In formula (2), $R^1$ is a substituted or unsubstituted monovalent hydrocarbon group of 1 to 10 carbons, and preferably 1 to 8 carbons, which may be exemplified by those groups mentioned above for $R^2$ which do not contain an aliphatic unsaturated bond. Preferred examples include alkyl, aryl, aralkyl and substituted alkyl groups, such as methyl, ethyl, propyl, phenyl and 3,3,3-trifluoropropyl.

Component (E) has a molecular structure which may be linear, cyclic, branched or a three-dimensional network. The SiH groups (silicon-bonded hydrogen atoms) may be present at the ends, in the middle, or at both the ends and the middle of the molecular chain. The type of organohydrogenpolysiloxane (E) most suitable in the inventive composition is one in which the number of silicon atoms on the molecule is preferably about 3 to 100, and especially about 10 to 50. It is desirable for the mole ratio of hydrogen atoms bonded directly to silicon atoms to be in a range of 30 to 95 mole percent, based on all the silicon atoms in the organohydrogenpolysiloxane. In other words, the organohydrogenpolysiloxane in which "b" in formula (2) is 0.3 to 0.95 is preferred. At a mole ratio above 95 mole percent, the tear strength of the coated base fabric tends to decline, whereas a mole ratio of less than mole percent may result in slowing of the crosslinking reaction and reduced base fabric strength.

Specific examples of suitable organohydrogenpolysiloxane (E) include 1,1,3,3-tetramethyldisiloxane, methylhydrogen cyclic polysiloxane, methylhydrogensiloxane-dimethylsiloxane cyclic copolymer, methylhydrogenpolysiloxane capped at both ends with trimethylsiloxy groups, dimethylsiloxane-methylhydrogensiloxane copolymer capped at both ends with trimethylsiloxy groups, dimethylpolysiloxane capped at both ends with dimethylhydrogensiloxy groups, dimethylsiloxane-methylhydrogensiloxane copolymers capped at both ends with dimethylhydrogensiloxy groups, methylhydrogensiloxane-diphenylsiloxane copolymers capped at both ends with trimethylsiloxy groups, methylhydrogensiloxane-diphenylsiloxane-dimethylsiloxane copolymers capped at both ends with trimethylsiloxy groups, copolymers composed of $(CH_3)_2HSiO_{1/2}$ units and $SiO_{4/2}$ units, copolymers composed of $(CH_3)_2HSiO_{1/2}$ units, $(CH_3)_3SiO_{1/2}$ units and $SiO_{4/2}$ units, and copolymers composed of $(CH_3)_2HSiO_{1/2}$ units, $SiO_{4/2}$ units and $(C_6H_5)_3SiO_{1/2}$ units.

The organohydrogenpolysiloxane (E) is added in an amount containing 0.5 to 3.0 moles of SiH groups of the organohydrogenpolysiloxane (E) per mole of alkenyl groups (alkenyl groups bonded to silicon atoms) supplied by components (A) and (D) combined. The addition of less than 0.5 mole makes the surface of the applied silicon rubber coat after it has been cured feel tackier, whereas the addition of more than 3.0 moles lowers the strength of the coated base fabric.

Component (F) of the silicone rubber composition according to the invention is a platinum group catalyst. Exemplary platinum group catalysts include those commonly used in addition-curable silicone compositions, such as finely divided platinum powder, platinum black, hexachloroplatinic acid, tetrachloroplatinic acid, olefin complexes of hexachloroplatinic acid, complexes of hexachloroplatinic acid with methylvinylsiloxane, rhodium compounds and palladium compounds. The platinum group catalyst is added in an amount containing 1 to 2,000 parts by weight, and preferably 5 to 1,000 parts by weight, of platinum group metal atoms per million parts by weight of components (A) to (E) combined.

The inventive composition is generally used as a two-part system, the two parts being mixed and stirred together prior to use. A reaction inhibitor commonly used in addition-curable silicone rubber compositions may be employed to adjust the composition so as to attain a good balance between the curing time and the period during which the composition may be used. Examples of known inhibitors suitable for this purpose include acetylene alcohol compounds, cyclic or aliphatic vinyl group-bearing polysiloxanes, triallylisocyanurate and silyl-modified derivatives thereof, and alkyne-bearing silane or siloxane compounds.

Various types of additives known to be used as silicone rubber additives, including inorganic fillers, pigments and heat stabilizers, may be added and blended into the inventive composition, insofar as the objects of the invention are attainable. Specific examples of such additives include titanium oxide, carbon black, red iron oxide ($Fe_2O_3$), rare earth oxides and cerium silanolate.

The inventive composition is particularly suitable for use in curtain air bags, in connection with which airtightness is often a concern. Accordingly, for the film applied onto the base fabric to have a low thickness and yet maintain the ability to block the airtightness, it is effective to impart thixotropy to the composition and thereby lower penetration of the composition to the interior of the base fabric. To this end, the inventive composition preferably has a viscosity of 40 to 1,000 poise as measured with a viscometer at 25° C. and 20 rpm, and a thixotropy index, given by a ratio of the viscosity at 4 rpm to the viscosity at 20 rpm, within a range of 1.05 to 4.0, and especially 1.1 to 2.0. A thixotropy index lower than 1.05 tends to result in easy penetration by the composition to the fabric interior, lowering the airtightness of the thin coat. Such penetration can be avoided by increasing the viscosity of the composition, although a higher viscosity makes it more difficult to apply a thin coat. A thixotropy index greater than 4.0 makes it impossible to apply a thin coat of the inventive composition to the base fabric. The foregoing problems can be resolved by setting the thixotropy index within the above-indicated range.

The silicone rubber composition of the invention is coated onto a suitable synthetic woven air bag fabric, examples of which include woven fabrics made of polyamide fibers such as nylon 6, nylon 66 or nylon 46, aramid fibers, polyalkylene terephthalate and other polyester fibers, polyetherimide fibers, sulfone fibers and carbon fibers. After coating, the composition is cured to give a silicone rubber-coated air bag base fabric. The synthetic fiber air bag fabric most preferable for use together with the inventive composition is a woven fabric made of nylon 66 fibers. When coating the organopolysiloxane composition onto the synthetic woven air bag fabric, the viscosity of the inventive composition may be adjusted to facilitate coating by adding an organic solvent such as xylene or toluene.

The composition of the invention is typically produced by first uniformly blending components (A) and (B), or components (A), (B) and (D), in a mixing apparatus such as a two-roll mill, a kneader mixer, a pressure kneader mixer or a Ross mixer to form a silicone rubber base. Components (C), (E) and (F) are then added to the rubber base and blended to give the silicone rubber composition.

If necessary, optional components such as organic solvents, pigments and heat stabilizers are added to above components (A) to (F) and the mixture is uniformly blended, following which the resulting composition is coated onto the synthetic woven air bag fabric. The coated fabric is placed in a hot-air drying oven, where it is heat-cured, thereby giving a silicone rubber-coated base fabric for air bags.

The heat-cured silicone rubber obtained from the inventive composition preferably has a JIS-A hardness in a range of 20 to 60. The use of a composition which cures to this hardness in combination with a synthetic woven air bag fabric results in strong, integral bonding of the silicone rubber coat to the fabric.

EXAMPLES

The following examples and comparative examples are provided to illustrate the invention, and are not intended to limit the scope thereof. In the examples, all parts are by weight, and viscosity is measured at 25° C. Abbreviations used in the examples are "cst" for centistokes, "Me" for methyl and "Vi" for vinyl.

Example 1

The following components were mixed to uniformity in a Ross mixer to give a silicone rubber base: 100 parts of a dimethylpolysiloxane having a viscosity of 1,000 cst and capped at both ends of the molecular chain with dimethylvinylsiloxy groups, 3.0 parts of hexamethyldisilazane-treated fumed silica having a specific surface area of 200 m$^2$/g, and 20 parts of a vinyl group-bearing methylpolysiloxane resin composed of $Vi(Me)_2SiO_{1/2}$ units, $Me_3SiO_{1/2}$ units and $SiO_{4/2}$ units (vinyl group content, 2.2% by weight).

A liquid silicone rubber coating composition was then prepared by adding to the above silicone rubber base and mixing to uniformity the following: 7.2 parts of methylhydrogenpolysiloxane of the average molecular formula $Me_3SiO(MeHSiO)_6(Me_2SiO)_4SiMe_3$ (which amount corresponds to a mole ratio of SiH groups in the methylhydrogenpolysiloxane to vinyl groups in the vinyl group-bearing dimethylpolysiloxane and the vinyl group-bearing methylpolysiloxane resin combined, abbreviated hereinafter as "H/Vi," of 1.8), 0.4 part of a complex of hexachloroplatinic acid and divinyltetramethyldisiloxane (platinum concentration, 0.4% by weight), 0.3 part of 3,5-dimethyl-1-hexyl-3-ol as a curing inhibitor, and 1 part of γ-glycidoxypropyltrimethoxysilane as the adhesive component.

The resulting composition was coated onto a woven fabric made of nylon 66 fibers (210 denier) and heated in an oven at 180° C. for 1 minute to effect curing. Coating was carried out with a coater using the minimum amount of liquid silicone rubber coating composition capable of evenly and uniformly covering the woven fabric. The silicone rubber-coated fabric was subjected to the tests described below.

Using a Scott abrasion tester, an abrasion test was conducted in which a sample was subjected to 1,000 rubbing cycles under an applied pressure of 2 kgf. Thereafter, the sample was visually examined for delamination of the thin coat of silicone rubber from the fabric surface.

The fire retardance was determined by performing a FMVSS302 flammability test.

An airtightness test was carried out in which the apparatus shown in FIG. 1 was pressurized to two atmospheres and the amount of air leakage measured. Samples having an air leakage of 0.02% or more failed the test. Referring to FIG. 1, a vessel 1 having a 10-liter volume was equipped with an air inlet 2 through which air was introduced into the vessel 1, and an air outlet 3 having an inside diameter of 60 mm over which the aforementioned silicone rubber-coated fabric 4 was placed and fastened such that the silicone rubber-coated side thereof faced the air outlet 3 The test was conducted by holding the pressure within the vessel 1 at 2 atmospheres and measuring the amount of air that leaked from the vessel.

Figure 2:
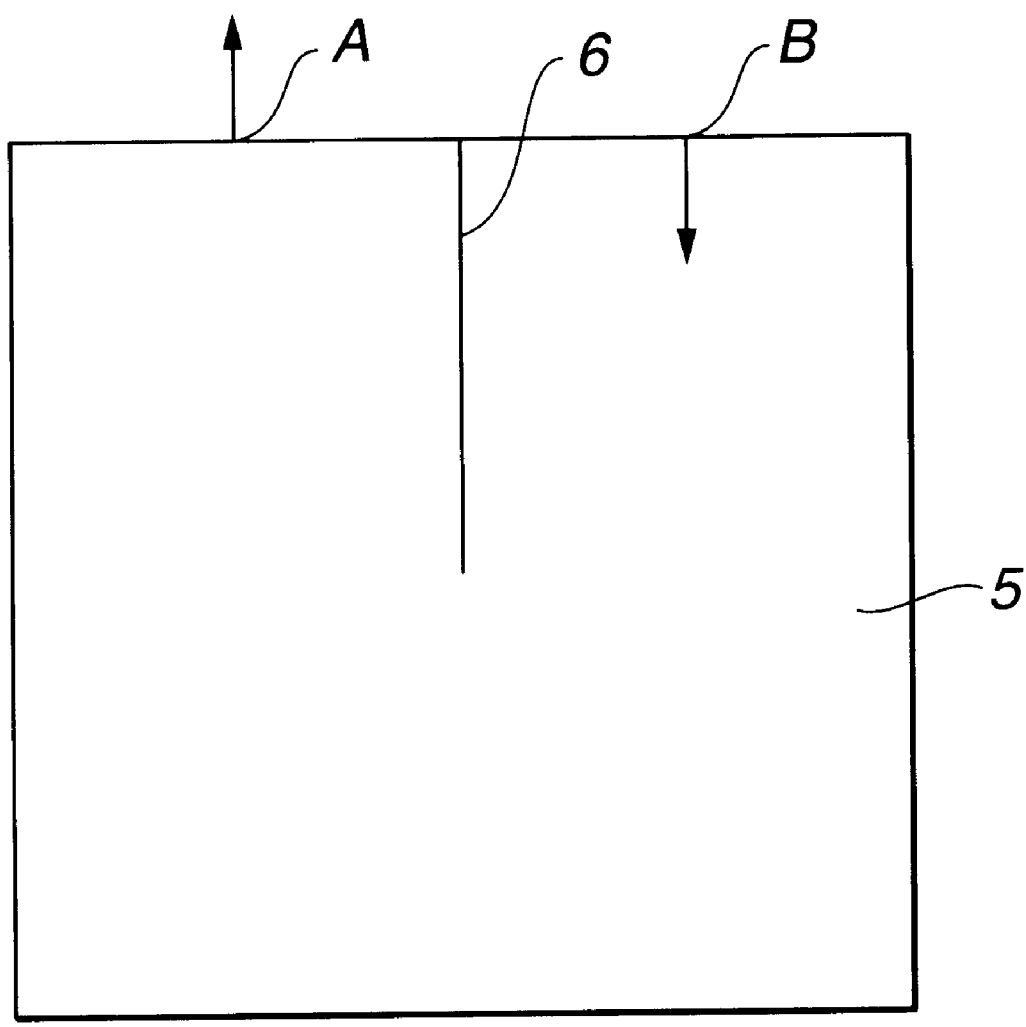
FIG. 2 schematically illustrates the method for testing tear strength used in evaluating the silane rubber compositions of the invention.

In addition, a tear test was performed in which the coated synthetic fiber air bag fabric was cut as shown in FIG. 2 and the tear strength measured. Samples with a tear strength of less than 120 N/cm failed the test. Referring to FIG. 2, the sample was a 10–10 cm square piece of coated fabric having a 5-cm cut 6 at the center. Sections A and B were pulled in opposite directions indicated by the arrows at a rate of 200 mm/min, and the tear strength was measured.

The results of the above tests are presented in Table 1.

Example 2

Aside from changing the amount of hexamethyldisilazane-treated fused silica having a specific surface area of 200 m$^2$/g from 3.0 parts to 1.0 part, a silicone rubber-coated fabric was produced in the same way as in Example 1. The properties of the resulting coated fabric were tested as in Example 1. The results are given in Table 1.

Comparative Examples 1 and 2

The same procedure was followed as in Example 1, except that the amount of hexamethyldisilazane-treated fused silica having a specific surface area of 200 m²/g was changed to 0 part in Comparative Example 1, and to 6.0 parts in Comparative Example 2. In each case, the resulting silicone rubber composition was similarly coated onto a woven fabric made of nylon 66 fibers (210 denier) and heated in an oven at 180° C. for 1 minute to effect curing. The properties of the resulting coated fabrics were tested as in Example 1. The results are given in Table 1.

TABLE 1

|  |  | EX 1 | EX 2 | CE 1 | CE 2 |
| --- | --- | --- | --- | --- | --- |
| Properties of Silicone Rubber composition | Viscosity (poise)[1] | 60 | 40 | 20 | 180 |
|  | Thixotropy index[2] | 1.50 | 1.10 | 1.01 | 2.1 |
| Properties of coated sample | Tear test (N/cm) | 230 (Pass) | 190 (Pass) | 150 (Pass) | 100 (Fail) |
|  | Scott abrasion test | Pass | Pass | Pass | Fail |
|  | FMVSS302 flammability | Pass | Pass | Pass | Pass |
|  | Airtightness | Pass | Pass | Fail | Fail |

[1] Measured with a viscometer at 25° C. and 20 rpm.
[2] Defined as the ratio of the viscosity measured at 4 rpm to the viscosity measured at 20 rpm.

Example 3

The following components were mixed to uniformity in a Ross mixer to give a silicone rubber base: 100 parts of a dimethylpolysiloxane having a viscosity of 10,000 cst and capped at both ends of the molecular chain with dimethylvinylsiloxy groups, 1.0 part of hexamethyl-disilazane-treated fumed silica having a specific surface area of 200 m²/g, and 30 parts of a vinyl group-bearing methylpolysiloxane resin composed of $Vi(Me)_2SiO_{1/2}$ units, $Me_3SiO_{1/2}$ units and $SiO_{4/2}$ units (vinyl group content, 2.2% by weight).

A liquid silicone rubber coating compositions was then prepared by adding to the above silicone rubber base and mixing to uniformity the following: 8.3 parts of methylhydrogenpolysiloxane having the average molecular formula $Me_3SiO(MeHSiO)_6(Me_2SiO)_4SiMe_3$ (which amount corresponds to a H/Vi ratio of 2.1), 0.29 part of a complex of hexachloroplatinic acid and divinyltetramethyldisiloxane (platinum concentration, 0.4% by weight), 0.2 part of 3,5-dimethyl-1-hexyl-3-ol and 1.0 part of tetramethyltetravinylcyclotetrasiloxane as curing inhibitors, 1 part of vinyltrimethoxysilane as the adhesive component, and 1 part of the compound having the formula indicated below.

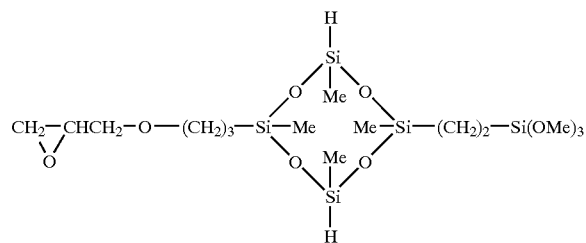

As in Example 1, the resulting composition was coated onto a woven fabric made of nylon 66 and cured, following which the properties of the silicone rubber-coated fabric were tested. The results are presented in Table 2.

Comparative Example 3

A liquid silicone rubber coating composition was prepared in the same way as in Example 3, except that the amount of hexamethyldisilazane-treated fused silica having a specific surface area of 200 m²/g was changed from 1.0 part to 10 parts. The liquid silicone rubber composition was similarly coated onto a woven fabric made of nylon 66 fibers (210 denier) and heated in an oven at 180° C. for 1 minute to effect curing. The properties of the resulting coated fabric were tested as in Example 1. The results are given in Table 2.

Comparative Examples 4 and 5

The same procedure was followed as in Example 3, except that the 8.3 parts of $Me_3SiO(MeHSiO)_6(Me_2SiO)_4SiMe_3$ used in Example 3 was changed to 8.5 parts of $Me_3SiO(MeHSiO)_2(Me_2SiO)_{18}SiMe_3$ (corresponding to a H/Vi ratio of 0.4) in Comparative Example 4, and to 7.3 parts of $Me_3SiO(MeHSiO)_{40}SiMe_3$ (corresponding to a H/Vi ratio of 3.8) in Comparative Example 5. In each case, the resulting silicone rubber composition was similarly coated onto a woven fabric made of nylon 66 fibers (210 denier) and cured by 1 minute of heating at 180° C. The properties of the resulting coated fabrics were tested as in Example 1. The results are given in Table 2.

TABLE 2

|  |  | EX 3 | CE 3 | CE 4 | CE 5 |
| --- | --- | --- | --- | --- | --- |
| Properties of Silicone Rubber composition | Viscosity (poise)[1] | 400 | 1,100 | 410 | 350 |
|  | Thixotropy index[2] | 1.65 | 4.1 | 1.7 | 1.5 |
| Properties of coated sample | Tear test (N/cm) | 270 (Pass) | 110 (Fail) | 105 (Fail) | 110 (Fail) |
|  | Scott abrasion test | Pass | Fail | Pass | Pass |
|  | FMVSS302 flammability | Pass | Pass | Pass | Pass |
|  | Airtightness | Pass | Fail | Fail | Fail |

As demonstrated by the results obtained in the above examples, the silicone rubber compositions for coating air bags of the invention have excellent adhesive strength to synthetic woven air bag fabric. Accordingly, when used together with such woven fabric, the inventive compositions provide air bag base fabrics of outstanding flexibility, sealability and deployability whose properties remain stable over time. Japanese Patent Application No. 11-353534 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone rubber composition for coating air bags, the composition comprising:

(A) 100 parts by weight of an organopolysiloxane having at least two silicon-bonded alkenyl groups per molecule, (B) from 0.5 to less than 5 parts by weight of finely divided silica, (C) 0.1 to 20 parts by weight of an organosilicon compound containing an epoxy group bonded to a silicon atom through an intervening alkylene group as an adhesive component, (D) 5 to 40 parts by weight of a silicone-soluble resin containing an $R_3SiO_{1/2}$ unit and an $SiO_2$ unit or $RSiO_{3/2}$ unit or both, and bearing at least one alkenyl group per molecule, wherein R is a substituted or unsubstituted monovalent hydrocarbon group, (E) an organohydrogenpolysiloxane containing at least two units per molecule selected from among $HR^1_2SiO_{1/2}$, $HR^1SiO$ and $HSiO_{3/2}$ units, wherein $R^1$ is a substituted or unsubstituted monovalent hydrocarbon unit without an aliphatic unsaturated bond, in a sufficient amount to provide 0.5 to 3.0 moles of SiH groups per mole of alkenyl groups in components (A) and (D) combined, and (F) a platinum group catalyst in a sufficient amount to provide 1 to 2,000 ppm of platinum group metal atoms based on the weight of components (A) to (E) combined.

2. An air bag coated with the silicone rubber composition of claim 1.

3. The air bag of claim 2, comprising a synthetic woven air bag fabric.

4. A silicone rubber composition for coating air bags, the composition comprising:

(A) 100 parts by weight of an organopolysiloxane having at least two silicon-bonded alkenyl groups per molecule, (B) from 0.5 to less than 5 parts by weight of finely divided silica, (C) 0.1 to 20 parts by weight of an adhesive component, (D) 5 to 40 parts by weight of a silicone-soluble resin containing an $R_3SiO_{1/2}$ unit and an $SiO_2$ unit or $RSiO_{3/2}$ unit or both, and bearing at least one alkenyl group per molecule, wherein R is a substituted or unsubstituted monovalent hydrocarbon group, (E) an organohydrogenpolysiloxane containing at least two units per molecule selected from among $HR^1_2SiO_{1/2}$, $HR^1SiO$ and $HSiO_{3/2}$ units, wherein $R^1$ is a substituted or unsubstituted monovalent hydrocarbon unit without an aliphatic unsaturated bond, in a sufficient amount to provide 0.5 to 3.0 moles of SiH groups per mole of alkenyl groups in components (A) and (D) combined, and (F) a platinum group catalyst in a sufficient amount to provide 1 to 2,000 ppm of platinum group metal atoms based on the weight of components (A) to (E) combined, wherein the composition obtained by mixing components (A) and (E) has a viscosity of 40 to 1,000 poise as measured with a viscometer at 25° C. and 20 rpm, and a thixotropy index of 1.05 to 4.0 as expressed by a ratio of the viscosity at 4 rpm to the viscosity at 20 rpm.

5. An air bag coated with the silicone rubber composition of claim 4.

6. The air bag of claim 5, comprising a synthetic woven air bag fabric.

7. A silicone rubber composition for coating air bags, the composition comprising:

(A) 100 parts by weight of an organopolysiloxane having at least two silicon-bonded alkenyl groups per molecule, (B) from 0.5 to less than 5 parts by weight of finely divided silica, (C) 0.1 to 20 parts by weight of an organosilicon compound containing an epoxy group bonded to a silicon atom through an intervening alkylene group as an adhesive component, (D) 5 to 40 parts by weight of a silicone-soluble resin containing an $R_3SiO_{1/2}$ unit and an $SiO_2$ unit or $RSiO_{3/2}$ unit or both, and bearing at least one alkenyl group per molecule, wherein R is a substituted or unsubstituted monovalent hydrocarbon group, (E) an organohydrogenpolysiloxane containing at least two units per molecule selected from among $HR^1_2SiO_{1/2}$, $HR^1SiO$ and $HSiO_{3/2}$ units, wherein $R^1$ is a substituted or unsubstituted monovalent hydrocarbon unit without an aliphatic unsaturated bond, in a sufficient amount to provide 0.5 to 3.0 moles of SiH groups per mole of alkenyl groups in components (A) and (D) combined, and (F) a platinum group catalyst in a sufficient amount to provide 1 to 2,000 ppm of platinum group metal atoms based on the weight of components (A) to (E) combined, wherein the composition obtained by mixing components (A) and (E) has a viscosity of 40 to 1,000 poise as measured with a viscometer at 25° C. and 20 rpm, and a thixotropy index of 1.05 to 4.0 as expressed by a ratio of the viscosity at 4 rpm to the viscosity at 20 rpm.

8. An air bag coated with the silicone rubber composition of claim 7.

9. The air bag of claim 8, comprising a synthetic woven air bag fabric.

* * * * *